United States Patent
Schmidt et al.

(10) Patent No.: US 11,435,222 B2
(45) Date of Patent: Sep. 6, 2022

(54) SCALE IN WHICH AT LEAST ONE BEARING PLATE HAS A HIGH STIFFNESS GEOMETRIC SHAPE

(71) Applicant: Minebea Intec Bovenden GmbH & Co. KG, Bovenden (DE)

(72) Inventors: Arne Schmidt, Bovenden (DE); Joerg Hachenberg, Bovenden (DE)

(73) Assignee: MINEBEA INTEC BOVENDEN GMBH & CO. KG

( * ) Notice: Subject to any disclaimer, the term of this patent is extended or adjusted under 35 U.S.C. 154(b) by 201 days.

(21) Appl. No.: 17/087,360

(22) Filed: Nov. 2, 2020

(65) Prior Publication Data

US 2021/0131859 A1  May 6, 2021

(30) Foreign Application Priority Data

Nov. 1, 2019  (DE) ...................... 10 2019 129 557.2

(51) Int. Cl.
| | |
|---|---|
| *G01G 21/22* | (2006.01) |
| *G01G 23/06* | (2006.01) |
| *G01G 23/00* | (2006.01) |
| G01G 21/28 | (2006.01) |

(52) U.S. Cl.
CPC .............. *G01G 23/06* (2013.01); *G01G 21/22* (2013.01); *G01G 23/005* (2013.01); *G01G 21/28* (2013.01)

(58) Field of Classification Search
CPC ........ G01G 21/22; G01G 21/23; G01G 21/28; G01G 23/06; G01G 23/005
USPC ........................................................ 177/238
See application file for complete search history.

(56) References Cited

U.S. PATENT DOCUMENTS

| | | | | |
|---|---|---|---|---|
| 4,237,988 A | * | 12/1980 | Blawert ............... | G01G 23/005 177/156 |
| 4,339,012 A | * | 7/1982 | Vogel ................... | G01G 19/445 D10/91 |
| 4,363,371 A | * | 12/1982 | Hutchinson ........... | G01G 21/22 D10/91 |
| 4,602,693 A | * | 7/1986 | Racicot ................. | G01G 21/22 177/255 |
| 4,711,313 A | | 12/1987 | Iida et al. ...................... | 177/127 |
| 5,072,977 A | | 12/1991 | Millman et al. ........... | 292/336.3 |
| 5,834,708 A | * | 11/1998 | Svetal .................... | G01G 21/28 235/462.43 |

(Continued)

FOREIGN PATENT DOCUMENTS

| | | | | |
|---|---|---|---|---|
| DE | 3642970 | 6/1987 | ............. | G01G 19/44 |
| DE | 4432858 | 3/1996 | ............. | G01G 19/44 |

(Continued)

*Primary Examiner* — Randy W Gibson
(74) *Attorney, Agent, or Firm* — Hayes Soloway P.C.

(57) ABSTRACT

A scale includes a scale pan for supporting goods to be weighed, and upper and lower bearing plates, wherein the scale pan is arranged above an upper bearing plate, and a weighing cell is arranged between the upper bearing plate and the lower bearing plate, wherein at least three feet are attached to the lower bearing plate, which are supported on a fixed area, wherein the lower bearing plate has a U-shaped cross-section, wherein, contiguous to respective stiffened areas of the U-shaped cross-section, there is a further region, which extends in parallel to a trough bottom, wherein the trough bottom is arranged between the two stiffened areas, and the trough bottom has a trapezoidal geometry.

20 Claims, 3 Drawing Sheets

(56) References Cited

U.S. PATENT DOCUMENTS

Figure 1:
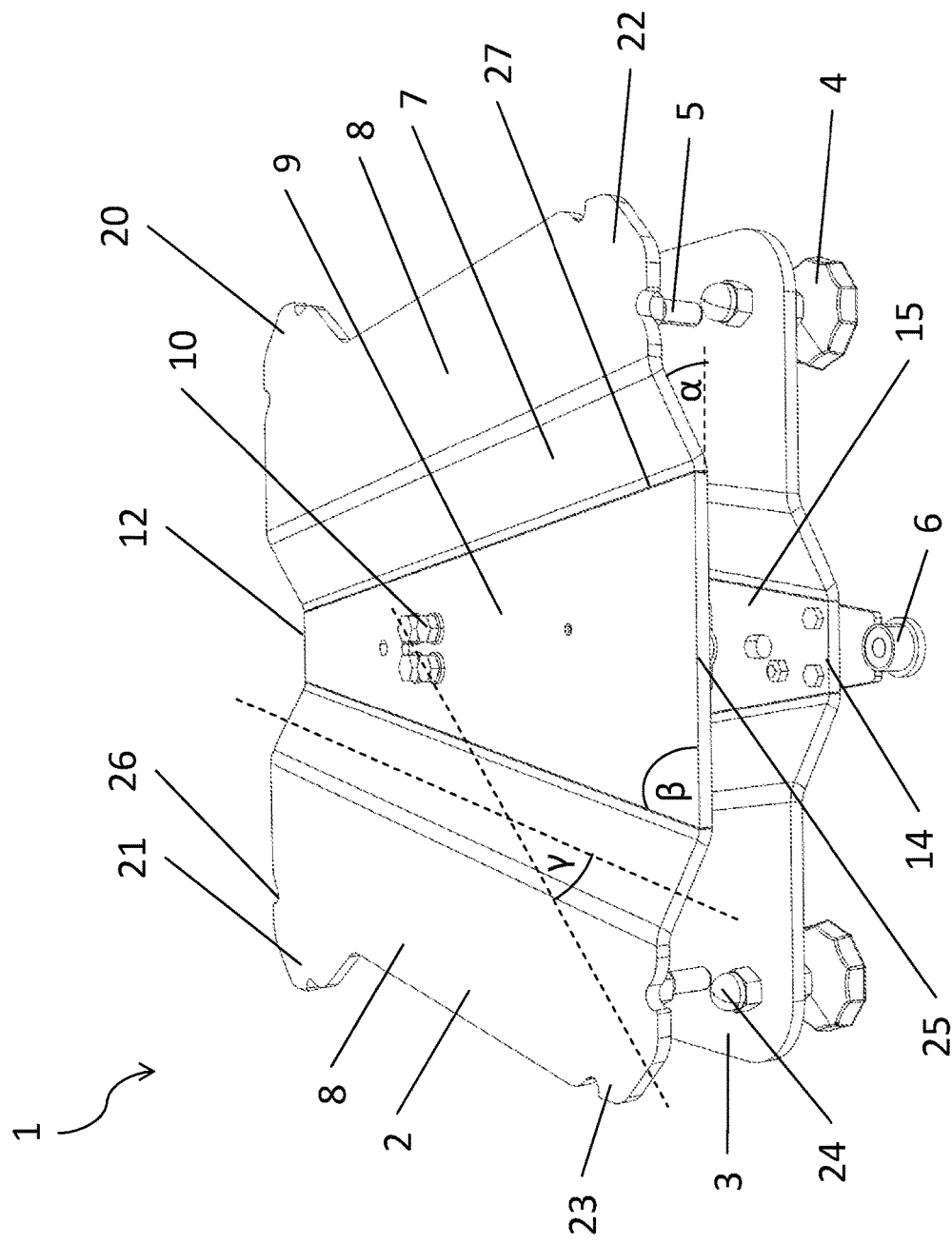

| | | | | |
|---|---|---|---|---|
| 5,955,705 A * | 9/1999 | Germanton | ............ | G01G 21/22 |
| | | | | 177/253 |
| 7,504,594 B1 * | 3/2009 | Ruth | ...................... | G01G 21/22 |
| | | | | 177/DIG. 9 |
| 8,664,547 B2 * | 3/2014 | Werner | .................... | G01G 3/10 |
| | | | | 177/229 |
| 2015/0292965 A1 * | 10/2015 | Sato | ...................... | G01L 1/2262 |
| | | | | 73/818 |
| 2018/0080810 A1 * | 3/2018 | Weiss | ...................... | G01G 19/52 |
| 2020/0289371 A1 * | 9/2020 | Biehl | ...................... | A61J 3/002 |

FOREIGN PATENT DOCUMENTS

| | | | | |
|---|---|---|---|---|
| DE | 10 2006 036 263 | 2/2008 | ............ | G01G 21/23 |
| DE | 10 2010 060 606 | 5/2012 | ............ | G01G 21/28 |

\* cited by examiner

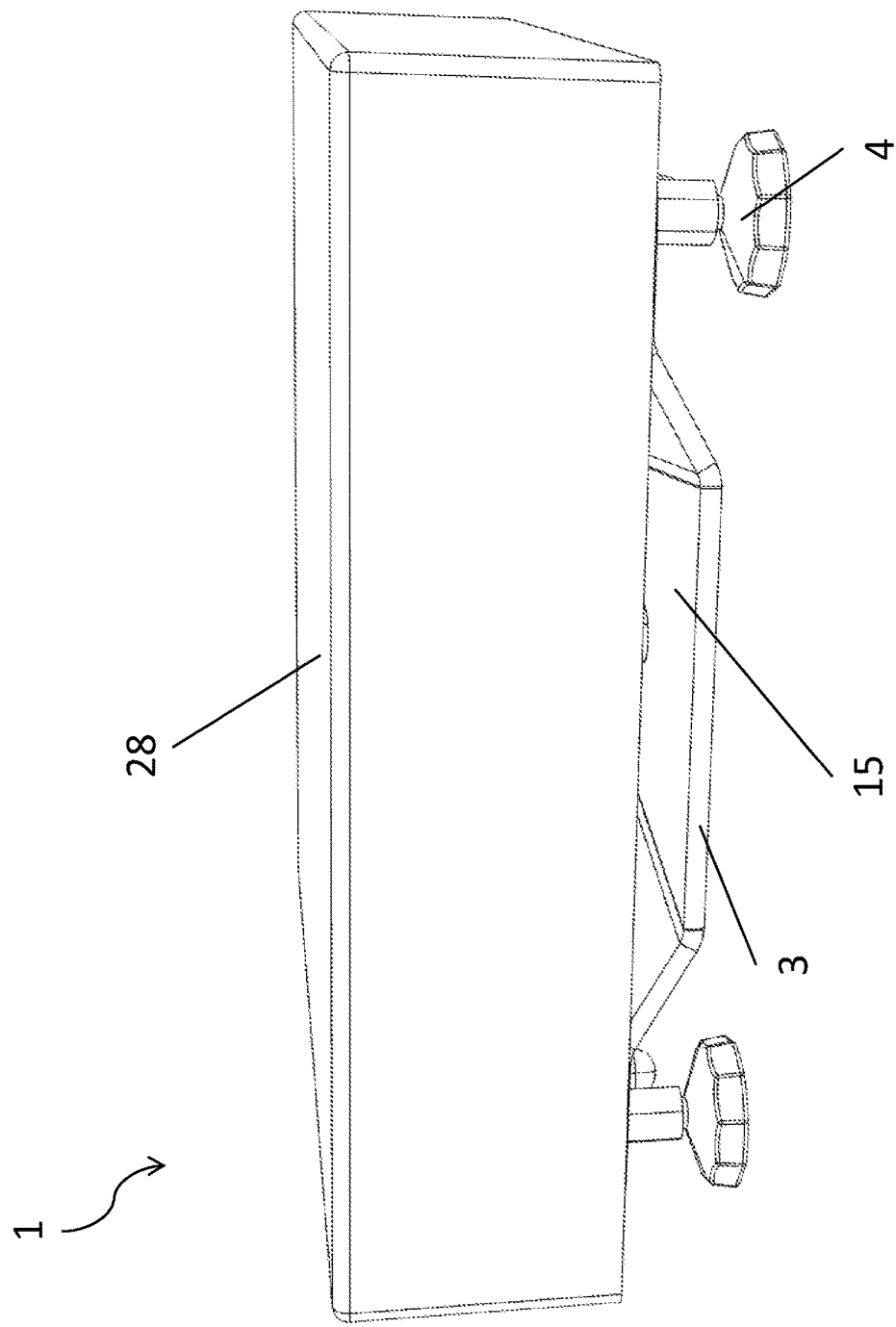

SCALE IN WHICH AT LEAST ONE BEARING PLATE HAS A HIGH STIFFNESS GEOMETRIC SHAPE

FIELD OF THE INVENTION

A scale comprising a scale pan for supporting goods to be weighed, and two bearing plates, wherein the scale pan is arranged above an upper bearing plate and a weighing cell is arranged between the upper bearing plate and a lower bearing plate, wherein at least three feet are attached to the lower bearing plate, which are supported on fixed ground.

BACKGROUND OF THE INVENTION

Scales of this type are known from the state of the art. For example, U.S. Pat. No. 5,072,799 A and DE 10 2006 036 263 disclose such a scale. In the prior art, increasing the stiffness of the bearing plate is achieved by attaching struts by means of welding or by manufacturing the bearing plate as an integral part, the bearing plate then preferably being made of an aluminum injection casting or a plastic injection casting. The latter are advantageous because welding involves high cost.

Furthermore, scales are known in which the bearing plates are bent out of a metal plate. Typically, they are bent in parallel lines, which particularly advantageously extend symmetrically to the longitudinal axis and are symmetrical to the center point. This is advantageous for the bending process.

SUMMARY OF THE INVENTION

It is therefore an object of the present invention to provide a scale in which at least one bearing plate has a high stiffness.

This object is achieved by a weighing device of the initially mentioned type in that the lower bearing plate has a U-shaped cross-section, wherein the legs of the U-shaped cross-section form stiffened areas and, contiguous to each of stiffened areas, there is a further region, which extends in parallel to a trough bottom, wherein the trough bottom is arranged between the two legs, and the trough bottom has a trapezoidal geometry. This results in a high stiffness of the bearing plate.

In a further embodiment, the stiffened areas are bent in an axis-symmetrical manner. This is achieved, starting out from a parallel extension of the lines, by having the bending lines open out toward the corner regions of one end of the bearing plate. Due to the axis-symmetrical bending of the stiffened areas, the bending process is not made more complex. In particular, the external edges of the lower bearing plate and/or the upper bearing plate are designed in such a manner that they can be used as stops for the bending process. Particularly advantageously, each stiffened area has at least two bends. By these means, thinner material thicknesses can be used for the upper bearing plate and/or the lower bearing plate, which lowers the cost of manufacturing the scale.

In a further embodiment, the stiffened areas are at an angle to the trough bottom that is smaller 90° and larger than 20°. This is advantageous because the minimum length of the stiffened areas is limited by the bending machine. Furthermore, however, the angle is larger than 20°, in particular larger than 30°, since otherwise the stiffness is disadvantageously reduced.

In a further embodiment, at least one attachment point of the weighing cell to the upper bearing plate is arranged near a shorter base of the trapezoidal trough bottom. By these means, the attachment point of the load receiver of the weighing cell is eccentrically connected to the upper bearing plate. Preferably, the attachment point for a mechanical ground of the weighing cell is also connected to the lower bearing plate in an eccentric fashion. This results in a stiffening being arranged close to the attachment points, and the stiffened areas extend to the remoter corners of the upper bearing plate and/or the lower bearing plate. This causes stiffening, in particular, of the long lever arm. The mechanical ground is that region of the weighing cell which is arranged on the side opposite to the load receiver and which forms the fixed region of the weighing cell. Due to the arrangement of these attachment points, low-cost shear beam weighing cells can be used, as well as weighing cells which are based on the principle of electromagnetic force compensation. The scale can thus cover a very large load range and achieve extremely high accuracy.

In a further embodiment, the upper bearing plate has the same geometry as the lower bearing plate, wherein the shorter base of the trough bottom of the upper bearing plate and a shorter base of the trough bottom of the lower bearing plate are arranged to face in opposite directions. The attachment points for the load receiver and for the mechanical ground are therefore at the same position on each bearing plate. Preferably, at least one attachment point of the weighing cell to the lower bearing plate is arranged near the shorter base of the trapezoidal trough bottom. In particular, the lower bearing plate can be dimensioned smaller than the upper bearing plate, so that the scale pan cannot interfere with the lower bearing plate. Alternatively, the upper bearing plate and the lower bearing plate can have the same dimensions. By these means, the upper bearing plate and the lower bearing plate can be manufactured at low cost, since only one geometry needs to be established for the bearing plate, and when assembling the scale, the upper bearing plate and the lower bearing plate only need to be mounted in opposite orientations. Furthermore, when the attachment points are arranged near the shorter base of the trapezoidal trough bottom, the attachment points are provided at a region that has high stiffness, since the distance between the stiffened areas and the attachment points is smaller than at the opposite side.

In a further embodiment, the angle between the base of the trapezoid-shaped trough bottom and at least one leg of the trapezoid-shaped trough bottom is between 40° and 87°, preferably between 60° and 87°, particularly preferably between 75° and 87°. This results in the forces, which act on the bearing plate, being received at a point closer to the load receiver of the weighing cell and the legs being situated closer to the weighing cell.

In a further embodiment, the distances from the corner regions, which are arranged at an end of the upper bearing plate and/or the lower bearing plate, which are situated on the same line as the shorter base of the trapezoidal trough bottom, to the respective leg that is arranged closer to the respective corner region, are larger than the distance between the corner regions that are situated at an opposite end of the upper bearing plate and/or lower bearing plate and the respective closest leg. In other words, the distance between the corner regions, which are arranged closer to the attachment points of the weighing cell and the respective stiffened area is larger than the distance between the corner regions and the respective closest stiffened area on the opposite side. By these means, the scale pan can have a rectangular geometry and is fully supported by the corner regions of the upper bearing plate.

In a further embodiment, dampening load receiving elements between the scale pan and the upper bearing plate are arranged at least at all four corners of the upper bearing plate. By these means shock-like loads, vibrations and other externally applied vibrations are reliably dampened. Furthermore, electrostatic coupling from the scale pan to the weighing cell can be achieved.

In a further embodiment, both the upper bearing plate and/or the lower bearing plate are formed of the same material. This saves manufacturing cost in the manufacture of the upper bearing plate and/or the lower bearing plate. Furthermore, this improves the stiffness and the ease of cleaning. Furthermore, this provides a very hygienic design, since all bends are radiussed and thus any soiling can be better rinsed off or cleaned off.

In a further embodiment, at least two overload stops are arranged between the upper bearing plate and the lower bearing plate. Preferably, the overload stops comprise a rod, in particular a stud bolt, including an external thread at least at its ends and having each of both ends covered by a domed nut. This results in an extremely cost-effective overload stop, which can be easily adjusted in height by threading in the domed nut and, at the same time, has a hygienic design since the domed nut is completely closed and has a half-circular geometry.

In a further embodiment, the feet of the scale have a decagonal geometry. Preferably, the areas between the corners are convexly curved. This allows the scale to be easily leveled. Furthermore, the feet are connected to the lower bearing plate. For this purpose, the feet preferably include a stud bolt that is passed through a through hole in the lower bearing plate. Subsequently, the end of the stud bolt, which was passed through the through hole is fitted with a domed nut. The end of the stud bolt and the domed nut are thus on an upper surface of the lower bearing plate. Preferably, the through hole has an internal thread. A further nut is provided on the stud bolt, which is on the underside of the lower bearing plate. The domed nut and the further nut can thus be locked against each other, enabling locking of the stud bolt and/or the foot.

SHORT DESCRIPTION OF THE DRAWINGS

Figure 2:
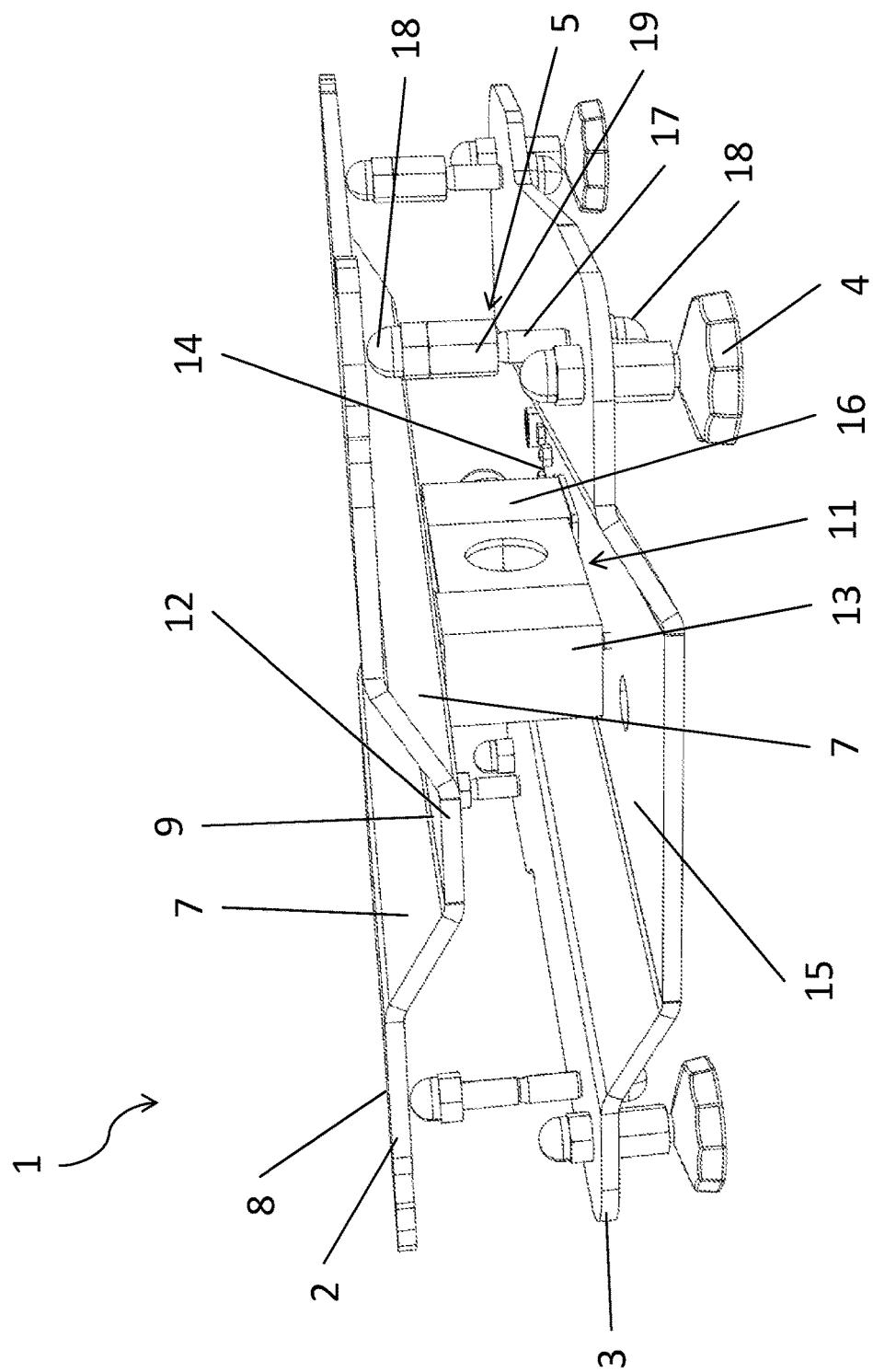

Further advantageous aspects can be derived from the following description of preferred exemplary embodiments with reference to the drawings, wherein:

FIG. 1 schematically shows the scale;
FIG. 2 also schematically shows the scale; and
FIG. 3 shows the scale fitted with a load pan.

DETAILED DESCRIPTION OF THE EXEMPLARY EMBODIMENTS

FIG. 1 shows a scale 1, comprising an upper bearing plate 2 and a lower bearing plate 3, at least three feet 4 and at least two overload stops 5. Furthermore, a circular spirit level 6 is arranged at the lower bearing plate 3. The scale pad 28 is not shown in FIG. 1.

The upper bearing plate 2 has a U-shaped cross-section, wherein the legs 7 of the U-shaped cross-section form stiffened areas 7, wherein, to each of these stiffened areas 7, a further region 8 is contiguous, which extends in parallel to the trough bottom 9, wherein the trough bottom 9 is arranged between the two stiffened areas 7 and the trough bottom 9 has a trapezoidal geometry, wherein the trapezoidal geometry is preferably an isosceles trapezoid. The stiffened areas 7 are bent in an axis-symmetrical fashion. The stiffened areas 7 are at an angle α to the trough bottom 9 that is smaller than 90° and larger than 20°. Furthermore, the angle β between a base 12, 14, 25 of the trapezoid-shaped trough bottom 9 and at least one leg 27 of the trapezoid-shaped trough bottom 9 is between 40° and 87°, preferably between 60° and 87°, particularly preferably between 75° and 87°.

The attachment points 10, or the attachment screws 10 of the weighing cell 11 to the upper bearing plate 2 are arranged near a shorter base 12 of the trapezoidal trough bottom 9. The attachment points 10 for the load receiver 13 of the weighing cell 11 are therefore eccentrically connected to the upper bearing plate 2.

The lower bearing plate 3 has the same geometry and the same cross-section as the upper bearing plate 2, wherein the shorter base 12 of the trough bottom 9 of the upper bearing plate 2 and a shorter base 14 of the trough bottom 15 of the lower bearing plate 3 face in opposite directions, or the lower bearing plate 3 is assembled in an alignment that is rotated by 180°. The attachment points 10 for the load receiver 13 and for the mechanical ground 16 are thus arranged at the same position on each of the trough bottoms 9, 15. The attachment points 10 of the mechanical ground 16 to the lower bearing plate 3 are thus arranged near the shorter base 14 of the trapezoidal trough bottom 15 of the lower bearing plate 3.

The feet 4 have a decagonal geometry and are attached to the lower bearing plate 3. The feet comprise a stud bolt which is passed through a through hole and/or threaded in a threaded hole in the lower bearing plate 3. Subsequently, the end of the stud bolt, which was threaded, in particular, through the through hole, is covered by an optional domed nut 24. The end of the stud bolt and the domed nut 24 are therefore on an upper surface of the lower bearing plate 3.

The upper bearing plate 2 and the lower bearing plate 3 each have four corner regions 20-23, wherein two front corner regions 20, 21 are on the same line as the shorter base 12 of the trapezoidal trough bottom 9 of the upper bearing plate 2, and as the shorter base 14 of the trapezoidal trough bottom 15 of the lower bearing plate 3, respectively, and two back corner regions 22, 23, which are on the same line as the longer base 25 of the trapezoidal trough bottom 9, 15 of the upper bearing plate 2 and the lower bearing plate 3, respectively. The distance between the front corner regions 20, 21 and the respective stiffened areas 7 that are closer to the front corner regions 20, 21, is larger than the distance between the back corner regions 22, 23, which are arranged at an opposite end, or on the same line as the longer base 25 of the trapezoidal trough bottom 9, 15 of the upper bearing plate 2 and/or the lower bearing plate 3, respectively, and the respective stiffened area 7.

Additionally, at the four corner regions 20-23 of the upper bearing plate 2, indentations 26 are provided, at which dampening load receiving elements can be arranged. Preferably the load receiving elements are electrostatically dissipating.

Furthermore, the angle γ between the stiffened area 7 and an imaginary line extending between the at least one of the attachment points 10 and the back corner region 23, is between 5° and 50°, preferably between 10° and 40°, particularly preferably between 15° and 35°. In particular, the imaginary line extends to the center point of the corner region 23.

FIG. 2 shows a further schematic representation of the scale 1, wherein the weighing cell 11, the overload stops 5 and the upper bearing plate 2 and the lower bearing plate 3 are shown. Furthermore, it can be seen that the load receiver 13 is eccentrically attached to the upper bearing plate 2, and the mechanical ground 16 is also eccentrically attached to the lower bearing plate 3, and each of the attachment points 10 is arranged near the shorter base 12, 14.

The four overload stops 5 are arranged between the upper bearing plate 2 and the lower bearing plate 3. They comprise a stud bolt 17 threaded into the lower bearing plate 3 and a domed nut 18 arranged on each end of the stud bolt 17. The stud bolt 17 only has an external thread at both ends. The middle region of the stud bolt 17 is not provided with a thread. Furthermore, below the top domed nut 18, a locking nut 19 is arranged, which is only partially provided with an internal thread.

FIG. 3 shows the scale 1 in the assembled state provided with the scale pan 28. The feet 4 and the lower bearing plate 3, in particular the trough bottom 15 of the lower bearing plate 3, are not fully hidden by the scale pan 28.

List of Reference Numerals 1 scale
2 upper bearing plate
3 lower bearing plate
4 foot
5 overload stop
6 circular spirit level
7 leg/stiffened area
8 further region
9 trough bottom of upper bearing plate
10 attachment point
11 weighing cell
12 shorter base of upper bearing plate
13 load receiver
14 shorter base of lower bearing plate
15 trough bottom of lower bearing plate
16 mechanical ground
17 stud bolt
18 domed nut of overload stop
19 locking nut
20 front corner region
21 front corner region
22 back corner region
23 back corner region
24 domed nut of foot
25 longer base
26 indentation
27 leg of the trapezoid-shaped trough bottom
28 scale pan

The invention claimed is:

1. A scale, comprising a scale pan for supporting goods to be weighed, and upper and lower bearing plates, wherein the scale pan is arranged above the upper bearing plate, and a weighing cell is arranged between the upper bearing plate and the lower bearing plate, wherein at least three feet are attached to the lower bearing plate, which are supported on a fixed area, wherein the lower bearing plate has a U-shaped cross-section, wherein, contiguous to respective stiffened areas of the U-shaped cross-section, there is a further region, which extends in parallel to a trough bottom, wherein the trough bottom is arranged between the two stiffened areas, and the trough bottom has a trapezoidal geometry.

2. The scale according to claim 1, wherein the stiffened areas are bent in an axis-symmetrical manner.

3. The scale according to claim 1, wherein the stiffened areas are at an angle ($\alpha$) to the trough bottom that is smaller than 90° and larger than 20°.

4. The scale according to claim 1, wherein the angle ($\beta$) between a base of the trapezoid-shaped trough bottom and at least one leg of the trapezoid-shaped trough bottom is between 40° and 87°.

5. The scale according to claim 1, wherein at least one attachment point of the weighing cell to the lower bearing plate is arranged near a shorter base of the trapezoidal trough bottom.

6. The scale according to claim 5, wherein the distances from the corner regions, which are arranged at an end of the upper bearing plate and/or the lower bearing plate, which are situated on the side of the shorter base of the trapezoidal trough bottom, to the respective stiffened area that is arranged closer to the respective corner region are larger than the distances between the corner regions that are situated at an opposite end of the upper bearing plate and/or lower bearing plate and the respective closest stiffened area.

7. The scale according to claim 5, wherein the lower bearing plate has the same geometry as the upper bearing plate, wherein the shorter base of the trough bottom of the upper bearing plate and the shorter base of the trough bottom of the lower bearing plate are arranged to face in opposite directions.

8. The scale according to claim 7, wherein at least one attachment point of the weighing cell to the upper bearing plate is arranged near the shorter base of the trapezoidal trough bottom.

9. The scale according to claim 1, wherein a load receiver of the weighing cell is connected to the upper bearing plate in an eccentric fashion.

10. The scale according to claim 1, wherein a mechanical ground of the weighing cell is connected to the lower bearing plate in an eccentric fashion.

11. The scale according to claim 1, wherein dampening load receiving elements between the scale pan and the upper bearing plate are arranged at least at all four corner regions of the upper bearing plate.

12. The scale according to claim 11, wherein the load receiving elements are electrostatically dissipating.

13. The scale according to claim 1, wherein the upper bearing plate and/or the lower bearing plate are formed of the same material.

14. The scale according to claim 1, wherein at least two overload stops are arranged between the upper bearing plate and the lower bearing plate.

15. The scale according to claim 14, wherein the overload stops comprise a stud bolt including an external thread at least at one end and having both ends covered by a domed nut.

16. The scale according to claim 1, wherein the feet have a decagonal geometry.

17. The scale according to claim 2, wherein the stiffened areas are at an angle ($\alpha$) to the trough bottom that is smaller than 90° and larger than 20°.

18. The scale according to claim 2, wherein the angle ($\beta$) between a base of the trapezoid-shaped trough bottom and at least one leg of the trapezoid-shaped trough bottom is between 40° and 87°.

19. The scale according to claim 6, wherein the lower bearing plate has the same geometry as the upper bearing plate, wherein the shorter base of the trough bottom of the upper bearing plate and the shorter base of the trough bottom of the lower bearing plate are arranged to face in opposite directions.

20. The scale according to claim 19, wherein at least one attachment point of the weighing cell to the upper bearing plate is arranged near the shorter base of the trapezoidal trough bottom.

* * * * *